July 19, 1955 W. L. EDDY 2,713,619

MAGNETIC CONDITIONING DEVICE

Filed March 27, 1951

Wesley L. Eddy
*INVENTOR.*

*BY* [signatures]

ATTORNEYS

United States Patent Office
2,713,619
Patented July 19, 1955

2,713,619

MAGNETIC CONDITIONING DEVICE

Wesley L. Eddy, Downers Grove, Ill., assignor to Ampro Corporation, Chicago, Ill., a corporation of Illinois Application March 27, 1951, Serial No. 217,721

1 Claim. (Cl. 179—100.2)

This invention relates to conditioning a tape form magnetic record body prior to making a record thereon, by demagnetizing the record body after having subjected it to a magnetic field of intensity sufficient to magnetically saturate the magnetizable material of the record. In accordance with the present invention this operation is accomplished by a magnetic field of unvarying polarity, typified by that produced by a permanent magnet. More specifically, the invention relates to conditioning only a single one of plural recording track areas that extend longitudinally of the tape form record body in spaced side by side relation.

The application of Edmund Barany, Harold W. Bauman and Melvin Sackter, Serial Number 194,917, filed November 9, 1950, and the application of Edmund Barany and Melvin Sackter, Serial Number 194,916, filed November 9, 1950, disclose a so-called "erase head" for accomplishing conditioning in the manner involved in the present invention. In brief, the erase head comprises a supporting bracket in which is mounted a small magnet of modified horseshoe form which is provided with a pair of polar surfaces that are spaced in the direction of record body travel and that are dimensioned in the direction extended transversely of a record body traveling past them to limit the transverse extent of the magnetic field to a single one of the areas to be erased. As a practical matter, the recording track areas of a tape form record body are somewhat narrower than the erase areas. The recording areas, therefore, are spaced apart by a region wherein no recording is made. Conveniently, this region may be termed a "guard band."

It is unavoidable in commercial production of permanent magnets, and probably also in direct current electric magnets, that variation from magnet to magnet occurs in field intensity, with a consequent variation in amount of field fringing of different magnets. Therefore, the problem arises of so arranging the record path and the magnet as to limit the magnetic field to accomplish erasing of only a single one of the tracks, regardless of the variance of degree of field fringing of a particular magnet from a preselected standard. The present invention is directed to a solution of this problem.

Figure 1:
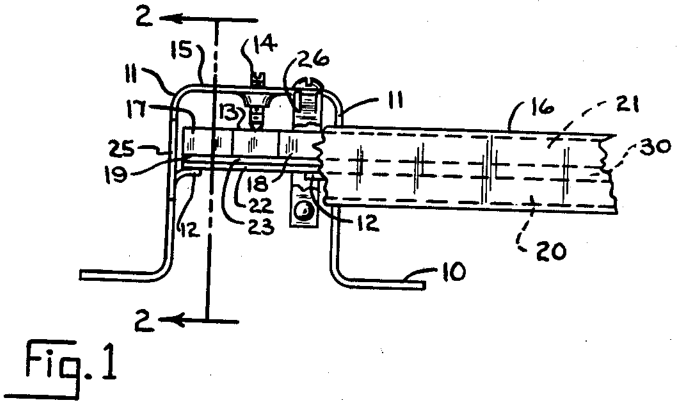
Figure 1 is a front elevation of an erasing assembly of the general structure and arrangement of those described by the above-identified applications, and provided with the present invention, the structure being partly broken away to disclose the invention.
Figure 2:
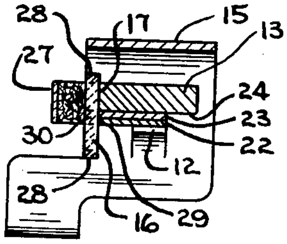
Figure 2 is an enlarged fragmentary section on line 2—2 of Figure 1.
Figure 3:
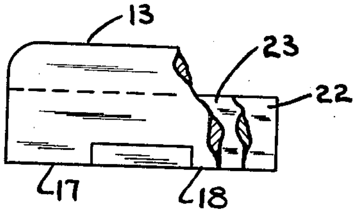
Figure 3 is a plan of a magnet provided with fringe field confining means arranged in accordance with one form of the invention.

Describing the drawings in detail, and first referring to Figures 1 to 3, the erase head assembly includes a bracket member 10 that comprises a pair of side arms 11 having intermediate inwardly struck tongues 12 for contact by the ends of a magnet 13. A set screw 14 is threaded through the top reach 15 of the bracket and secures the magnet by forcing it against the tongues 12. The bracket may be provided with means for governing the closeness of approach of a record body 16 to a pair of polar surfaces 17, 18 of the magnet, which surfaces are spaced in the direction of travel of record body 16 and which surfaces are of a width substantially corresponding to that of an erasing area of a record body. Polar surfaces 17, 18 have corresponding co-linear margins 19 that are adjacent to a record body area and thus laterally adjacent to the record body area in register with surfaces 17, 18. These margins also extend in the direction of travel of the record body. They are formed by the corners between the polar surfaces 17, 18, and a surface of the body of the magnet which extends at right angles to the polar surfaces, here the lower surface of the magnet.

In order to limit intensity of a field portion fringing to a recording track area 20 of record body 16 that is adjacent to an erasing area 21 intended to be erased to an intensity insufficient to erase the adjacent area, a high permeability path is provided close to the surface of the body of the magnet lying at right angles to the co-linear margins 19. This high permeability path is provided by a metal shim 22 in the form of a thin flat plate that is secured to the surface of a low permeability spacer 23 which is secured to the under-surface 24 of the magnet. Spacer plate 23 is of a thickness to prevent substantial short-circuiting of the polar surfaces 17, 18 and, additionally, is of such thickness relative to the normal range of variation in magnetic field intensities as to space plate 22 sufficiently far from polar surfaces 17, 18, to prevent saturation of plate 22. Saturation, of course, would lead to a fringing of magnetic force lines from plate 22 which would defeat the purpose of the invention. The field-collecting plate 22 may rest against tongues 12, as shown in Figure 2, or plates 22, 23 may have cutouts to permit magnet 13 to bear on the tongues.

The tape form record body guide means disclosed are those described and claimed in the above-identified application, Serial Number 194,916. They comprise a cut-away portion 25 in the leading bracket leg 11 which permits the record body to contact the leading polar surface 17 and a guide device 26 that has a reach extended in front of the trailing polar surface 18, the device 26 being adjustable on the top bracket reach 15 for in-and-out adjustment so that the path of the record body past surface 18 may be adjusted to demagnetize the record body as completely as possible. A pressure pad 27 is arranged to maintain the record body 16 against the guide surfaces provided by the cutout 25 and the device 26.

The cutout 25 has end surfaces 28 that serve to position the record body laterally for registration of the area 21 that is to be conditioned with the polar surfaces 17, 18. The arrangement is so made that when a record body 16 is guided in the cut-out 25, the high permeability metal plate 22 will have its forward edge 29 in contact with the record body in the region spacing apart the two recording track areas 20, 21, that is to say, registered or lying within the transverse extent of the guard band 30.

Figure 4:
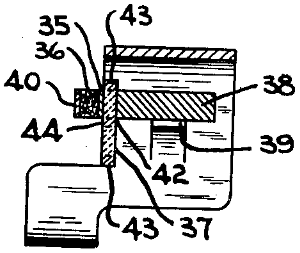
Figure 4 is a transverse section disclosing a second form of the invention.
Figure 6:
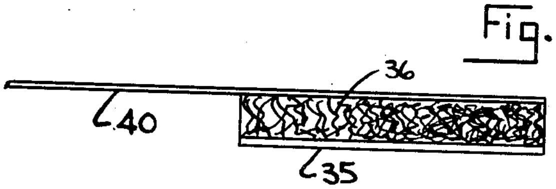
Figure 6 is a top plan of the pressure pad of Figure 5.
Figure 5:
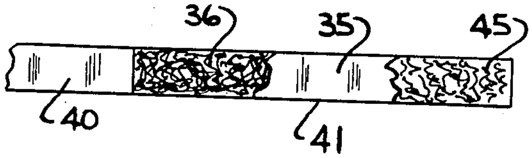
Figure 5 is a broken elevation of a pressure pad arranged in accordance with the second form of the invention.

The form of the invention shown in Figures 4 to 6 comprises a high permeability metal shim strip 35 mounted on the pressure pad 36 that is used to maintain a tape form record body against the surfaces provided by a cutout 37 and a guide device such as that designated 26 of the assembly of Figure 1. In this assembly the magnet 38 again is mounted on tongues 39 struck in from the legs of the supporting bracket. The thickness of the magnet is so selected as to correspond substantially to the width of the area that is to be erased. The high permeability strip 35 may be of the same width as the magnet, or wider, and is mounted as by a spring strip 40 to register with the opposite polar surfaces of the magnet. The lower edge 41 of the strip 35 and lower margin 42 of each of the magnetic polar surfaces are so spaced from the record body positioning end surfaces 43 of the cutout 37 as to register or lie within the area of the guard band 44 of the record body.

The surface of strip 35 may be coated with an adhesively secured flocking 45, to provide a yielding, soft surface for contacting the record body, and to increase the spacing of strip 35 from the polar surfaces to prevent its magnetic saturation.

It will be noted that in each of the above-described forms of the invention the function of the high permeability element is to concentrate the field of the magnet into a transverse area corresponding to that of the erasing area of the record body that is to be conditioned. In each case the high permeability member is extended in the direction of record body travel at least between the relatively remote extremities of the polar surfaces, that is to say, it extends completely and continuously between the edges of the magnet that are leading and trailing with respect to direction of record body travel.

In the foregoing, the terms "high magnetic permeability," and "highly magnetically permeable material" are intended to mean permeability and materials having permeability of the order of or greater than cold rolled steel. Low permeability material is considered as aluminum or copper alloys, or other material having similar characteristics of relatively limited magnetic permeability.

I claim:

In an assembly for demagnetizing a single one of plural record track areas that extend longitudinally of a magnetizable tape form record body adapted to be driven longitudinally past said assembly in a preselected path, and with a recording surface thereof facing the assembly, said assembly including lateral guide means for guiding a record body laterally in a preselected path, a magnet having polar surfaces facing the record body path, spaced apart in the direction of record body travel, having co-linear corresponding margins extended in the direction of record body travel and positioned for substantial concidence with an edge of a said record body area and with said polar surfaces registered with said area, a guide surface positioned for contact by the recording surface of the record body and fixing the closeness of its approach to said polar surfaces, and a pressure pad engageable with the surface of a record body opposite its recording surface and urging said body toward said polar surfaces and against said guide surface; a facing body of magnetically permeable material mounted on said pad for direct contact with said opposite record body surface, said facing body having a width disposed transverse to a record body that is at least as great as the width of a said record body area, and a length disposed in the direction of record body travel that is at least as great as the spacing between the margins of said polar surfaces that are remote in said direction, and said facing body being positioned on said pad for facing overlying relation to said polar surfaces in both the directions of their said width and the direction of their said remote margins.

References Cited in the file of this patent

UNITED STATES PATENTS

| | | |
|---|---|---|
| 2,144,844 | Hickman | Jan. 24, 1939 |
| 2,265,879 | Thurm | Dec. 9, 1941 |
| 2,361,752 | Eilenberger | Oct. 31, 1944 |
| 2,428,701 | Eilenberger | Oct. 7, 1947 |
| 2,535,712 | Wolfe | Dec. 26, 1950 |
| 2,549,771 | Camras | Apr. 24, 1951 |
| 2,561,338 | Camras | July 24, 1951 |
| 2,563,445 | Zenner | Aug. 7, 1951 |